(12) United States Patent
Wagner et al.

(10) Patent No.: US 6,234,541 B1
(45) Date of Patent: May 22, 2001

(54) U-BOLT CLAMP FOR SEALING LAP JOINTS

(75) Inventors: Wayne M. Wagner, Apple Valley; John T. Herman, Dellwood; Michael J. Protas, Golden Valley, all of MN (US); James P. Shields, Fairbank, IA (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/228,921

(22) Filed: Jan. 11, 1999

Related U.S. Application Data

(63) Continuation-in-part of application No. 09/025,895, filed on Feb. 18, 1998, now abandoned.

(51) Int. Cl.[7] ............................................ F16L 21/06
(52) U.S. Cl. ........................... 285/197; 24/277; 285/199; 285/420
(58) Field of Search .................... 285/197, 198, 285/199, 420, 382.2; 24/277; 248/62; 411/389, 401, 400

(56) References Cited

U.S. PATENT DOCUMENTS

| | | |
|---|---|---|
| D. 273,938 | 5/1984 | Piper . |
| 1,162,595 | 11/1915 | Forgey . |
| 1,783,509 | 12/1930 | Lahey . |
| 2,433,289 | 12/1947 | Morris . |
| 2,719,345 | 10/1955 | Riker . |
| 3,022,561 | 2/1962 | Jagiel . |
| 3,409,259 | 11/1968 | Cross . |
| 3,735,950 | 5/1973 | Paintin . |
| 3,879,815 | 4/1975 | Dowling et al. . |
| 3,955,250 | 5/1976 | Heckethorn . |
| 4,063,700 | 12/1977 | Brewer . |
| 4,113,289 | 9/1978 | Wagner et al. . |
| 4,122,586 | 10/1978 | Nothdurft . |
| 4,141,577 | 2/1979 | Beebe . |
| 4,143,844 | 3/1979 | Van Meter . |
| 4,183,122 | 1/1980 | Wagner . |
| 4,209,155 | 6/1980 | Florian . |
| 4,270,689 | 6/1981 | Canfield . |
| 4,365,399 | 12/1982 | Mahrus . |
| 4,388,749 | 6/1983 | Sassak . |
| 4,415,188 | 11/1983 | Ginter, Jr. . |
| 4,479,288 | 10/1984 | Jones . |
| 4,485,530 | 12/1984 | Begley et al. . |
| 4,488,334 | 12/1984 | Goforth . |
| 4,506,418 | 3/1985 | Viola et al. . |
| 4,558,891 | 12/1985 | Wagner et al. . |
| 4,629,226 | 12/1986 | Cassel et al. . |
| 4,640,536 | 2/1987 | Printiss, Sr. et al. . |
| 4,930,732 | 6/1990 | Hardtke . |
| 5,014,940 | 5/1991 | Sherman . |
| 5,215,281 | 6/1993 | Sherman . |

FOREIGN PATENT DOCUMENTS

| | | |
|---|---|---|
| 656476 | 1/1963 | (CA) . |
| 677 817 A5 | 6/1991 | (CH) . |
| 1 113 615 | 9/1961 | (DE) . |
| 0 449 738 A1 | 10/1991 | (EP) . |
| 1558373 | 2/1969 | (FR) . |

*Primary Examiner*—Eric K. Nicholson
(74) *Attorney, Agent, or Firm*—Merchant & Gould P.C.

(57) ABSTRACT

The present disclosure relates to guillotine clamp including a U-bolt mounted on a saddle member. The U-bolt has a concave portion that opposes a corresponding concave portion of the saddle member. At least one curved shim is positioned between the concave portions of the U-bolt and the saddle member to provide both sealing and clamping of a lap joint.

31 Claims, 12 Drawing Sheets

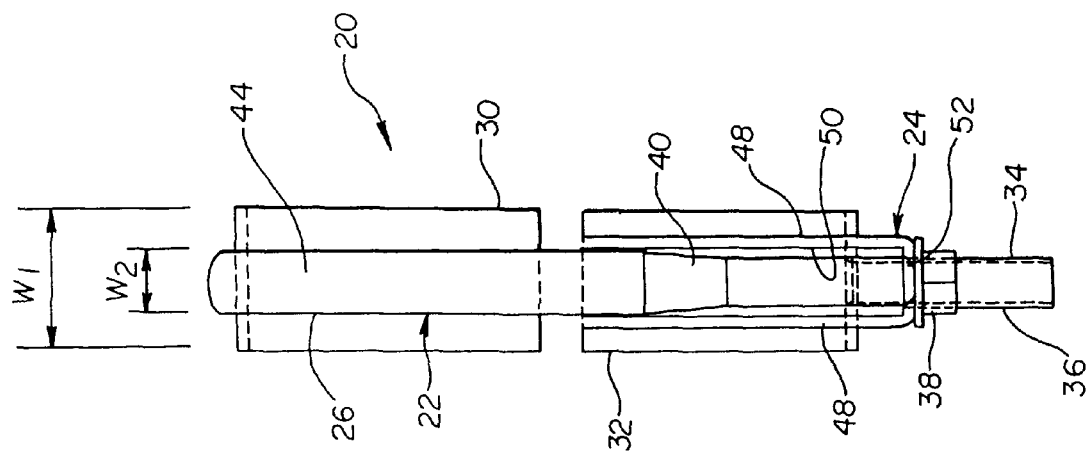
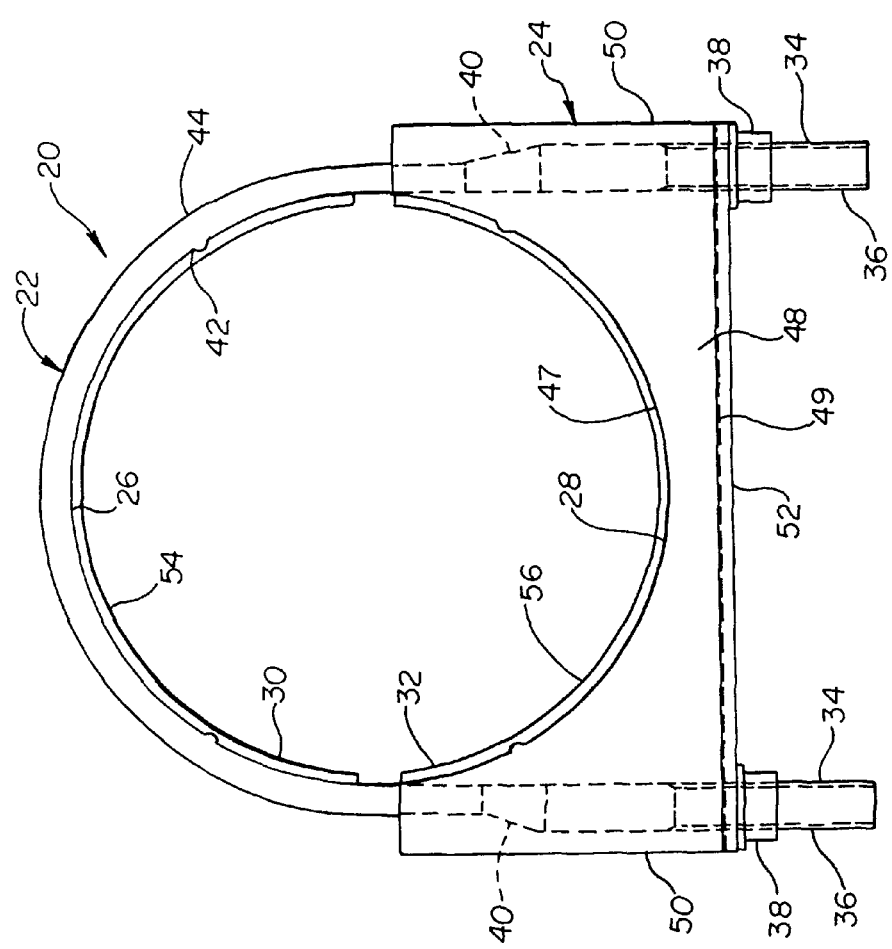

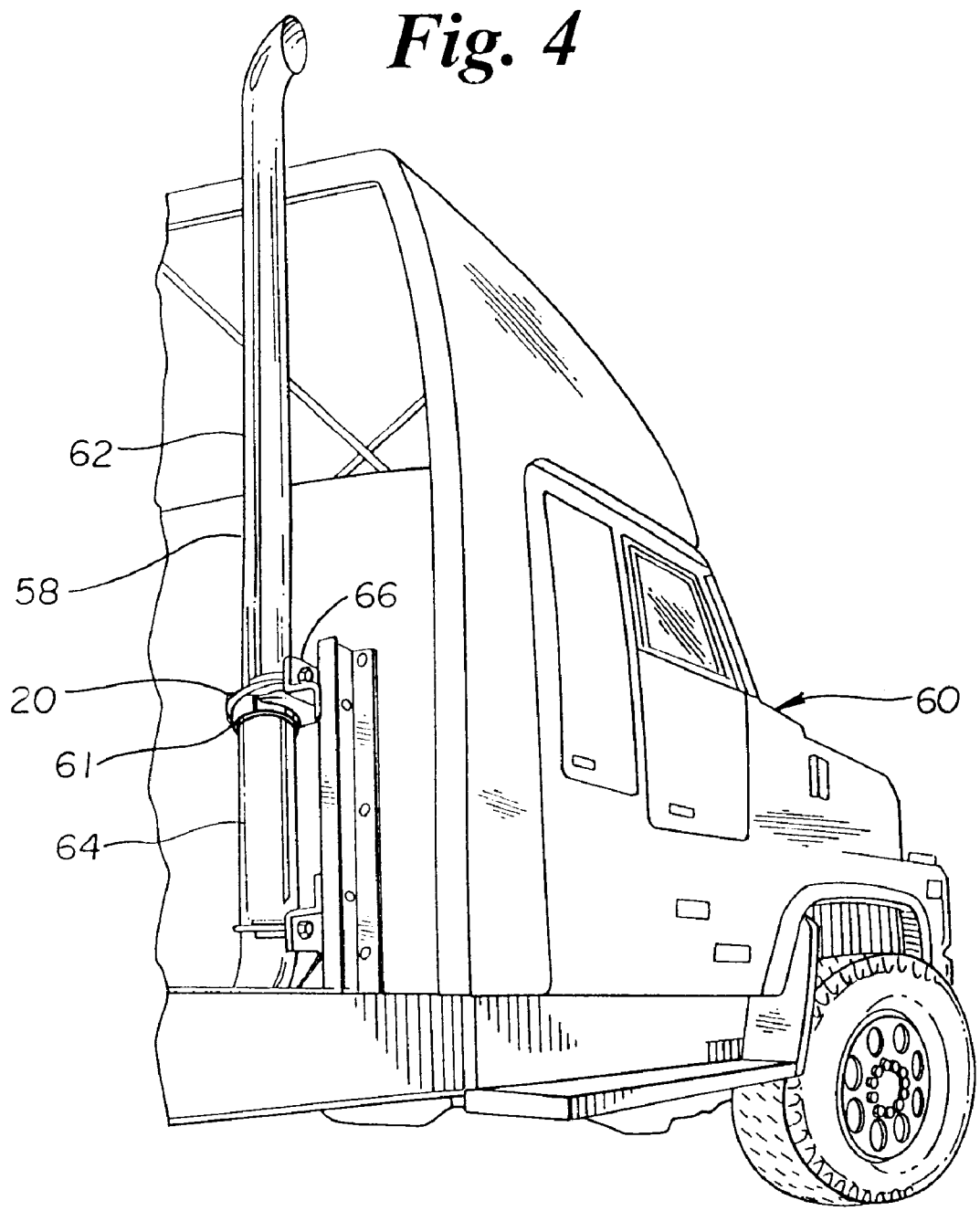

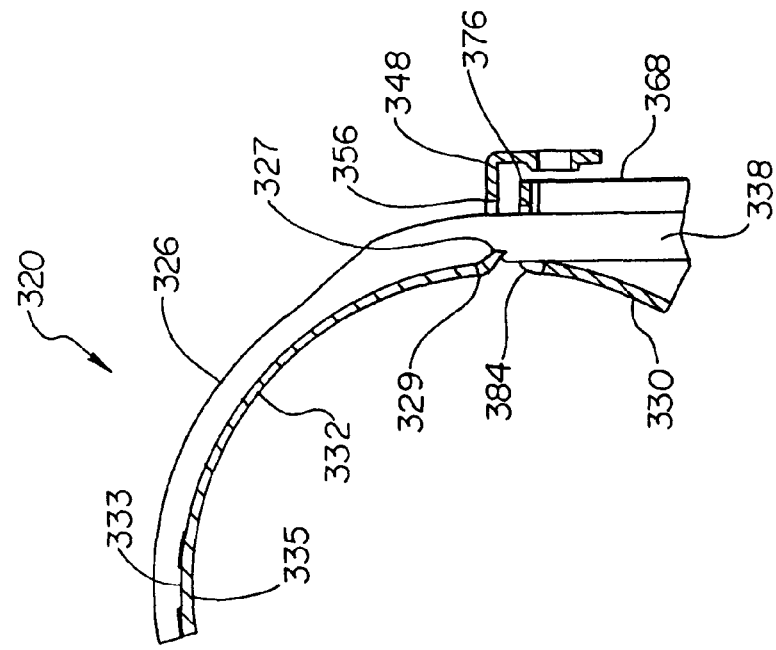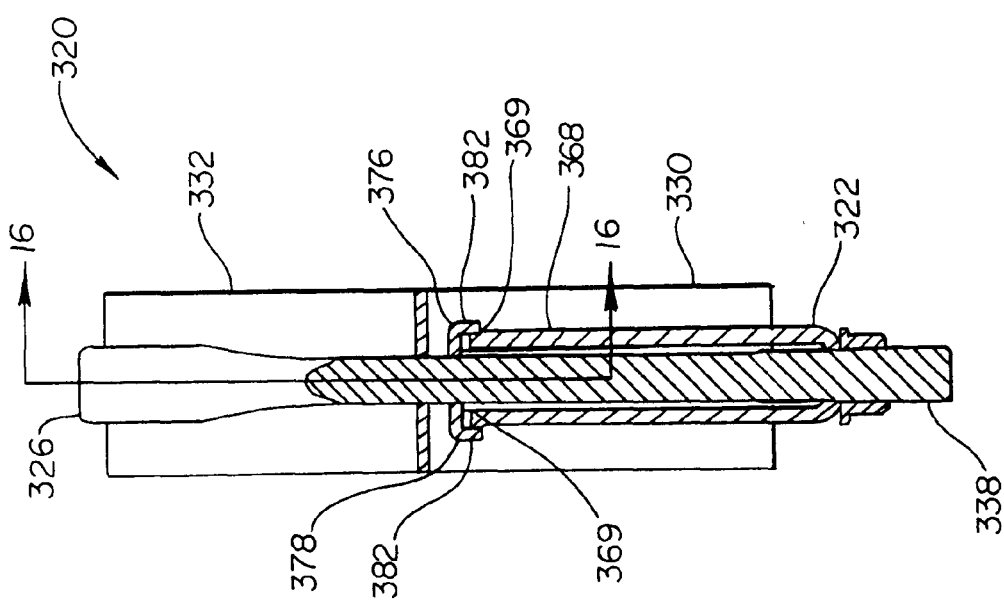

U-BOLT CLAMP FOR SEALING LAP JOINTS

CROSS-REFERENCE

This is a Continuation-in-Part of U.S. patent application Ser. No. 09/025,895, filed Feb. 18, 1998 now abandoned.

FIELD OF THE INVENTION

The present invention relates generally to conduit clamps. More particularly, the present invention relates to U-bolt clamps for use in association with exhaust systems.

BACKGROUND OF THE INVENTION

Automotive, truck and other vehicular exhaust systems typically include conduit for directing exhaust gas from an engine to a remote location. Such exhaust systems often include a muffler, catalytic converter, resonator, or a combination thereof for treating the exhaust gas before it is discharged to the atmosphere. To accommodate various design criteria, exhaust gas systems usually include several exhaust conduits, tubes, hoses or pipes of various shapes and lengths which are connected together to form a fluid path for the exhaust gas.

The most common way of interconnecting consecutive conduits is to utilize a lap joint. To make a lap joint, one end of a first conduit is inserted within an end of a second conduit. The conduits are then clamped at the region where the conduits overlap. A typical clamp functions to crush, crimp or otherwise deform the outer conduit against the inner conduit. The ends of the outer conduit typically include a plurality of longitudinal slots spaced about its circumference to facilitate crimping or otherwise deforming the outer conduit against the inner conduit.

It is important that exhaust clamps provide a substantially leak-proof and mechanically secure joint. Any leakage of exhaust at a joint presents a safety hazard because of escaping noxious fumes and a noise problem because of the pulsating nature of the flow through the conduit. Since a number of joints occur in most exhaust systems, it is also desirable that such clamps be inexpensive and relatively easy to install, and if possible, also be relatively easy to disconnect and reinstall.

A variety of clamps have been developed for use in association with lap joints. One common clamp is known as a guillotine or saddle-type clamp. This clamp includes a U-bolt which is mounted on a saddle. The U-bolt includes a concave portion that opposes a corresponding concave portion of the saddle. The saddle and U-bolt are forced towards each other through the use of a pair of nuts that are threaded on the legs of the U-bolt. U.S. Pat. Nos. 2,719,345 and 4,270,689 disclose guillotine or saddle-type clamps configured as described above.

Wide band, leak-proof clamps have also been developed for use in association with lap joints. Wide band clamps are typically designed to surround lap joints and cover all the deformation or take-up slots defined by the conduits forming the lap joints. Various versions of such clamps are illustrated in U.S. Pat. No. 4,629,226 and U.S. Pat. No. 4,558,891.

SUMMARY OF THE INVENTION

One aspect of the present invention relates to a guillotine or saddle-type clamp arranged for effectively and easily sealing a lap joint. The clamp includes a saddle member having an inwardly facing concave saddle portion, and a U-bolt mounted on the saddle member. The U-bolt has an inwardly facing concave portion that opposes the saddle member concave saddle portion. At least one curved shim is positioned (when assembled) between the U-bolt and the saddle member. The shim preferably is wider than either one of the U-bolt and the saddle member. Consequently, the shim cooperates with the U-bolt and the saddle member to more effectively surround and seal a lap joint.

The present invention provides numerous advantages over the prior clamps discussed above. For example, when using a conventional guillotine or saddle-type clamp at a lap joint, it can sometimes be difficult to achieve uniformly leak-proof joints because of the narrowness of such clamps. Specifically, when a conventional guillotine clamp is used at a lap joint, it can be difficult to completely cover and seal the longitudinal deformation slots formed at the ends of the exhaust tubing being connected. This problem is overcome by the present invention. Specifically, one aspect of the present invention teaches using a relatively wide shim in combination with a U-bolt and a saddle member to effectively and easily seal a lap joint. Furthermore, an effective seal can be achieved without requiring high installation torque that damages the exhaust tubing being sealed. Consequently, the clamp can easily be removed to allow the sealed joint to be taken apart for service and maintenance.

Another problem relating to existing guillotine-type clamps relates to corrosion. Specifically, conventional U-bolts and saddle members are typically made of zinc-plated cold rolled steel. By contrast, exhaust pipes and mufflers are typically made of aluminized steel. Consequently, when a zinc-plated guillotine clamp is clamped on a aluminized steel pipe or muffler, galvanic action between the clamp and the pipe or muffler causes premature corrosion of the pipe or muffler. To overcome the aforementioned problem, an aspect of certain preferred embodiments of the present invention relates to the preferable use of a shim with desirable galvanic properties to separate or insulate a U-bolt and saddle from a structure being clamped. The shim is preferably made of the same material as the structure being clamped, or is coated to inhibit galvanic action. Consequently, galvanic action between the tube/conduit structure being clamped and both the U-bolt and the saddle is inhibited. Although corrosion may occur on the outside of the shims where the shims engage the U-bolt and the saddle, unlike typical exhaust pipes or mufflers, the shims are preferably sufficiently thick to withstand substantial corrosion without experiencing significant adverse effects.

The present invention also provides advantages over conventional wide-band clamps. For example, while wide-band clamps are suitable for sealing lap joints, such clamps are not readily adapted for securing an exhaust conduit to structures of a vehicle. Hence, while such wide-band clamps can be used at lap joints, additional clamps, such as guillotine-type clamps, have generally also been required to effectively secure exhaust tubing to a vehicle. In contrast, a further aspect of the present invention relates to clamps capable of effectively sealing lap joints while concurrently providing means for securing exhaust pipes to a vehicle. Moreover, certain clamps constructed in accordance with the principles of the present invention are adapted for inhibiting localized tube/conduit deformation such that lap joints sealed by such clamps can easily be disassembled. Furthermore, clamps constructed in accordance with the principles of the present invention are adapted for effectively sealing lap joints having "captured slots" as disclosed in U.S. Pat. No. 4,113,289.

A variety of additional advantages of the invention will be set forth in part in the description which follows, and in part will be apparent from the description or may be learned by practicing the invention. It is to be understood that neither the foregoing general description nor the following detailed description is restrictive of the invention as claimed.

BRIEF DESCRIPTION OF THE DRAWINGS

The accompanying drawings, which are incorporated in and constitute a part of the specification, illustrate several aspects of the invention and together with the description serve to explain the principles of the invention. A brief description of the drawings is as follows:

FIG. 2 is a plan view of the clamp of FIG. 1;

FIG. 3 is a right side view of the guillotine clamp of FIG. 2;

FIG. 4 shows the clamp of FIGS. 1–3 being used to seal a lap joint on the exhaust system of a truck, the truck being shown in fragmented perspective view;

FIG. 15 is a cross-sectional view taken along section line 15—15 of FIG. 13;

FIG. 16 is a cross-sectional view taken along section line 16—16 of FIG. 15;

DETAILED DESCRIPTION

Reference will now be made in detail to various aspects of the present invention which are illustrated in the accompanying drawings. Wherever possible, the same reference numbers will be used throughout the drawings to refer to the same or like parts.

Figure 1:
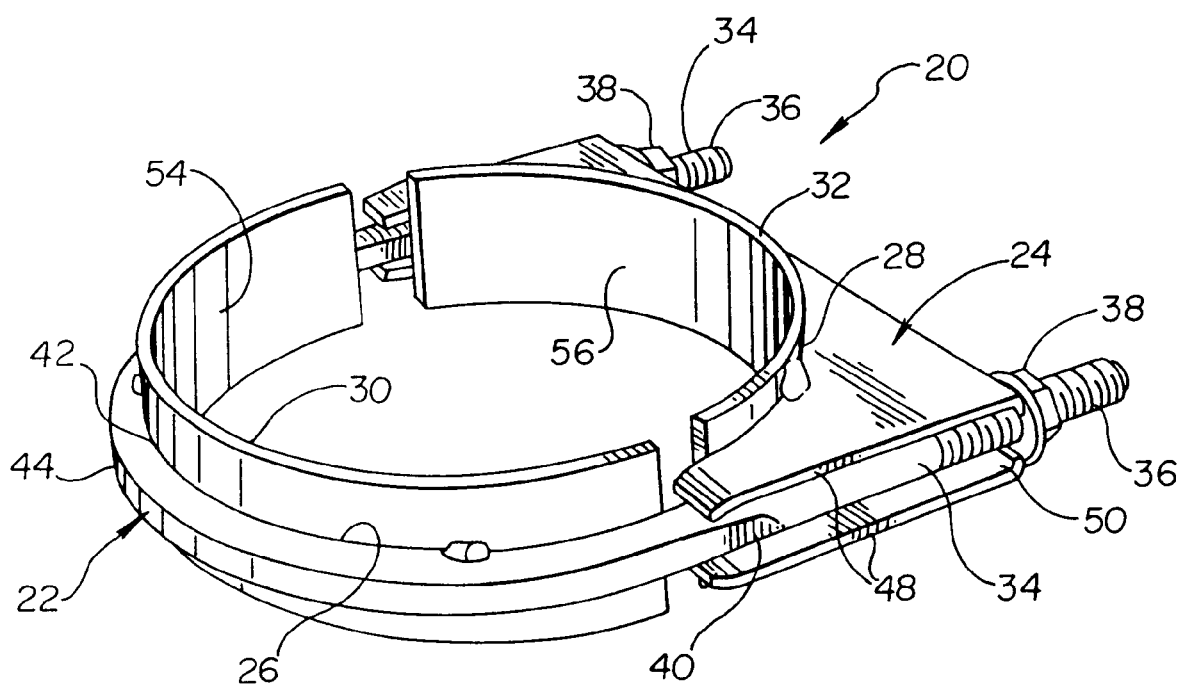
FIG. 1 is a perspective view of a clamp constructed in accordance with the principles of the present invention.

FIGS. 1–3 illustrate a clamp 20 constructed in accordance with principles of the present invention. Generally, the clamp 20 includes a U-bolt 22 mounted on a saddle member 24. The U-bolt 22 includes an inwardly facing, concave portion 26 which opposes a corresponding inwardly facing, concave portion 28 of the saddle member 24. Opposing first and second curved shims 30 and 32 are respectively secured to the concave portions 26 and 28. The first curved shim 30 has a concave side that is opposed to a concave side of the second curved shim 32. Herein the term "inwardly facing" means facing a conduit when in use. Also, the shim face directed against a conduit, in use, will sometimes be described as an "inner" face.

The U-bolt 22 of the clamp 20 includes a pair of spaced-apart, substantially parallel, legs 34 that project outward from the U-bolt concave portion 26. The legs 34 are generally cylindrical in shape and include threaded end portions 36 on which nuts 38 can be threaded. The legs 34 have substantially circular cross-sections while the U-bolt concave portion 26 preferably has a flattened cross-section. A transition region 40 is provided between the U-bolt legs 34 and the U-bolt concave portion 26. The transition region 40 includes tapers configured for providing a smooth transition from the round cross-section of the legs 34 to the flattened cross-section of the U-bolt concave portion 26.

Figure 6:
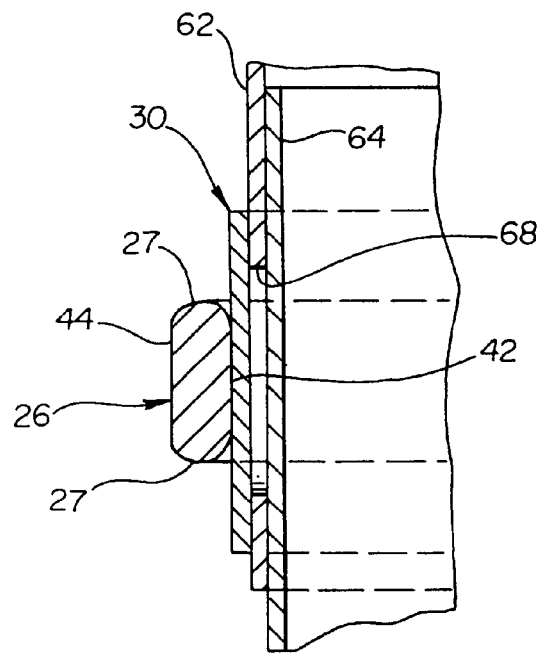
FIG. 6 is a cross-sectional view taken along section line 6—6 of FIG. 5.

The flattened configuration of the U-bolt concave portion 26 is clearly illustrated in the cross-sectional view of FIG. 6. As shown in FIG. 6, when a cross-section is cut through the U-bolt concave portion 26, the resulting edges or lines which correspond to inner and outer sides 42 and 44 of the U-bolt concave portion are substantially straight and substantially parallel. Furthermore, the U-bolt concave portion 26 also includes rounded edges 27 for providing a smooth transition between the inner and outer sides 42 and 44. It will be appreciated that the flattened configuration depicted in FIG. 6 is but one aspect of the present invention and is not intended to be construed as a limitation upon the scope of the present invention. For example, rounded edges 27 could alternatively be squared. Furthermore, the U-bolt concave portion 26 could have alternatively shaped cross-sections such as round, oval, square, parabolic, rectangular or any number of other different shapes.

Referring to FIGS. 1 and 3, the saddle member 24 of the clamp 20 has a double saddle configuration including two spaced apart and substantially parallel saddle plates 48. The saddle plates 48 define oppositely located side channels 50 sized and shaped for receiving the legs 34 of the U-bolt 22. Referring to FIG. 2, inner portions 47 of the saddle plates 48 define the saddle concave portion 28 while outer portions 49 of the saddle plates 48 are interconnected by a transverse plate 52. While a double saddle configuration is illustrated in FIGS. 1–6, one skilled in the art will recognize that a single saddle member configuration (having one wall instead of two) can also be utilized.

The first and second curved shims 30 and 32 of the clamp 20 are respectively welded to the U-bolt concave portion 26 and the saddle member concave portion 28. As secured to the U-bolt 22 and the saddle member 24, the curved shims 30 and 32 define opposing first and second inner surfaces 54 and 56 having concave curvatures. Furthermore, the curved shims 30 and 32 preferably have generally rectangular cross sections. A cross-section of the curved shim 30 is shown in FIG. 6.

A significant feature of the present invention relates to the width difference between the U-bolt concave portion 26 and the first and second curved shims 30 and 32. Preferably, as shown in FIG. 3, the first and second curved shims 30 and 32 each have a width $w_1$ that is greater than a width $w_2$ of the U-bolt concave portion 26. More preferably, the curved shims 30 and 32 each of widths $w_1$ which are at least 1½ times as wide as the width $w_2$ of the U-bolt concave portion 26. Most preferably, the curved shims 30 and 32 each have widths $w_1$ at least two times as wide as the width $w_2$ of the U-bolt concave portion 26. Typically and preferably $w_2$ is in the range of 0.50 to 0.62 inches; and $w_1$ is in the range of 1.25 to 1.50 inches.

FIG. 4 illustrates the clamp 20 used in association with an exhaust system 58 of a truck 60. Specifically, the clamp 20 is illustrated sealing a lap joint 61 formed between first and second pipes 62 and 64 of the exhaust system 58. The clamp 20 is also illustrated securing the first and second pipes 62 and 64 in a substantially vertical orientation. Specifically, the clamp 20 is connected to a mounting bracket 66 that is secured to the frame of the truck 60.

As shown in FIG. 4, the first pipe 62 is an elongated exhaust pipe or tail pipe, and the second pipe 64 is an end portion of a muffler. Although the clamp 20 is shown interconnecting an exhaust pipe to a muffler, it will be appreciated that clamps in accordance with the principles of the present invention can be used in association with all types of conduits such as tubes, pipes, hoses, catalytic converters and mufflers.

Figure 5:
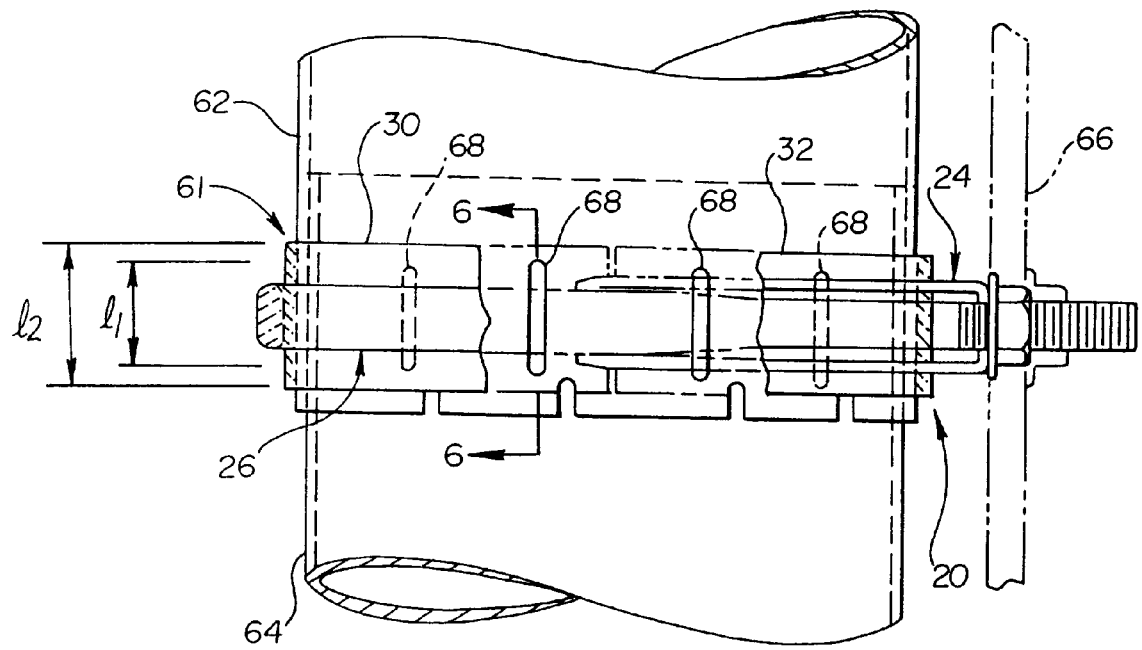
FIG. 5 is an enlarged fragmentary view of the lap joint of FIG. 4.

FIG. 5 shows an enlarged view of the lap joint 61 of FIG. 4. As shown in FIG. 5, the lap joint 61 is formed by telescopically inserting an end portion of the second pipe 64 within the first pipe 62 such that end portions of the pipes overlap. The first pipe 62 includes a plurality of circumferentially spaced longitudinal take-up or deformation slots 68 adapted for facilitating clamping the first pipe 62 against the second pipe 64. Each of the deformation slots 68 has a length $l_1$ that is shorter than the width $w_1$ of the curved shims 30 and 32. Consequently, the first and second curved shims 30 and 32 are adapted to completely cover the deformation slots 68 thereby providing a substantially fluid tight seal at the lap joint 61.

As indicated above, the clamp 20 can be used to both seal a lap joint, and secure exhaust conduit to a vehicle. One technique for using the clamp 20 includes the step of looping the U-bolt 22 around the overlapping first and second pipes 62 and 64. Next, the saddle member 24 is mounted on the U-bolt such that the pipes 62 and 64 are captured between the saddle member 24 and the U-bolt 22. The clamp 20 is then oriented such that the shims 30 and 32 completely cover the longitudinal deformation slots 68. The threaded ends 36 of the U-bolt 22 are then inserted through holes defined by the mounting bracket 66. After the threaded ends 36 have been inserted through the mounting brackets 66, nuts 38 are threaded on the threaded ends 36 of the U-bolt 22. As the nuts are tightened, the first and second curved shims 30 and 32 are drawn together causing the pipes 62 and 64 to be compressed between the shims 30 and 32 and also causing the lap joint 61 to be sealed.

A significant problem relating to prior art exhaust system clamps relates to corrosion. Specifically, conventional U-bolts and saddles are typically made of zinc-plated cold rolled steel. By contrast, exhaust pipes and mufflers are typically made of aluminized steel. Consequently, when a clamp having a zinc-plated U-bolt and saddle is clamped on a aluminized steel pipe or muffler, galvanic action between the clamp and the pipe or muffler causes premature corrosion of the pipe or muffler.

To overcome the aforementioned problem, it is preferred for the shims 30 and 32 to be made of or coated with a material that inhibits galvanic action between the shims and the structure being clamped. For example, the shims can be made of the same type of material as the pipe or muffler to which they are intended to be coupled. In this manner, when the clamp 20 is coupled to a muffler or exhaust pipe, the shims 30 and 32 completely separate and insulate the pipe or muffler from the U-bolt 22 and the saddle 24. Consequently, galvanic action between the structure being clamped and the U-bolt 22 and saddle 24 is inhibited thereby inhibiting galvanic action based corrosion of the pipe or muffler. Although galvanic action based corrosion may occur at regions where the U-bolt 22 and saddle 24 contact the shims 30 and 32, unlike typical exhaust pipes or mufflers, the shims 30 and 32 are preferably sufficiently thick to withstand substantial corrosion without experiencing significant adverse effects. It will be appreciated that any one of the shims, U-bolt and saddle can also be coated with preferred materials that are adapted to inhibit galvanic action. Illustrative coating materials include products sold under the name Sermetel® which are available from Teleflex Inc. of Limerick, Pa., and products sold under the name Dacromet® which are available from Metal Coatings International Inc. of Chardon, Ohio.

Because exhaust pipes and mufflers are most commonly made of aluminized steel, a preferred material of the shims 30 and 32 is aluminized steel. Mufflers and exhaust pipes are sometimes also made of stainless steel. Hence, the shims 30 and 32 could also be made of stainless steel. Although the above described materials are preferred, other materials can also be used without departing from the principles of the present invention.

Figure 7:
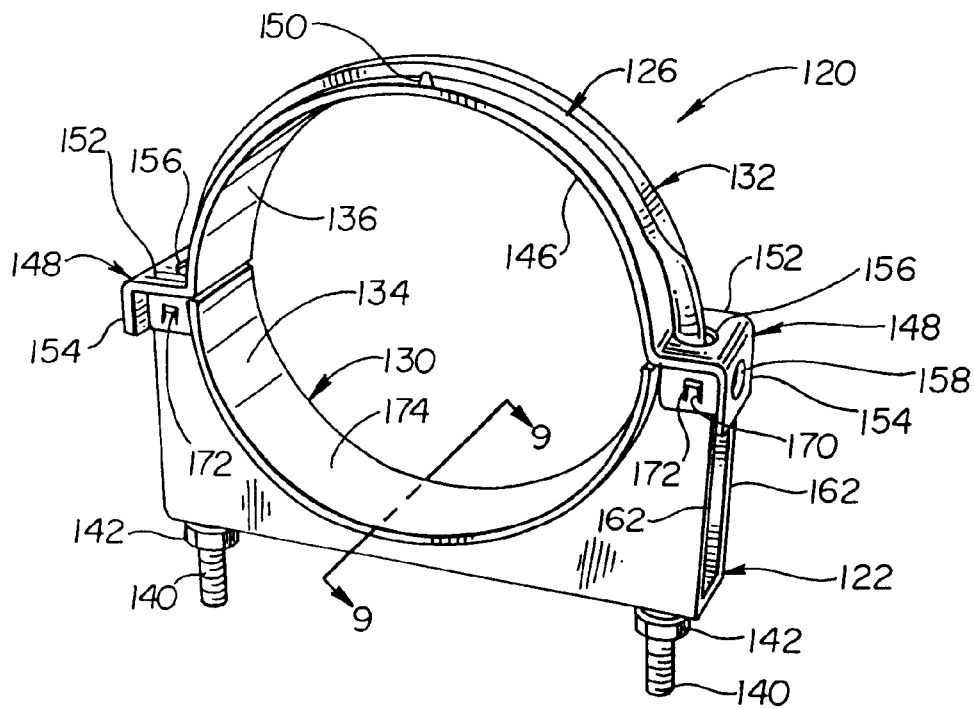
FIG. 7 is a perspective view of an alternate embodiment of a clamp constructed in accordance with the principles of the present invention.
Figure 8:
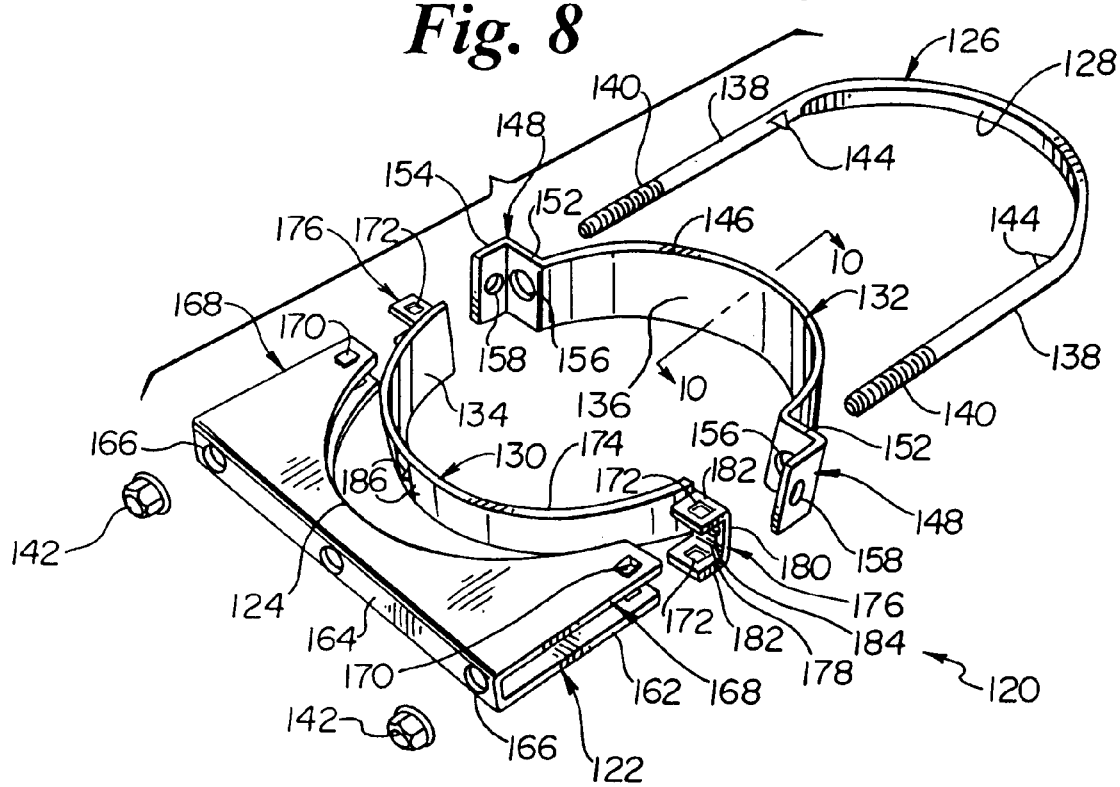
FIG. 8 is an exploded perspective view of the clamp of FIG. 7.

FIGS. 7 and 8 illustrate a first alternate clamp 120 constructed in accordance with the principles of the present invention. Generally, the clamp 120 includes a double saddle member 122 having an inwardly facing, concave, saddle portion 124. The clamp 120 also includes a U-bolt 126 mountable on the saddle member 122. The U-bolt 126 has an inwardly facing, concave portion 128 adapted to oppose the concave saddle portion 124. The clamp 120 further includes a first curved shim 130 secured to the concave saddle portion 124 of the saddle member 122, and a second curved shim 132 secured to the concave portion 128 of the U-bolt 126. The first and second curved shims 130 and 132 respectively have first and second inner concave sides 134 and 136 adapted to oppose one another.

The U-bolt 126 of the clamp 120 includes two spaced-apart substantially parallel legs 138 that project outward from the U-bolt concave portion 128. The legs 138 have threaded ends 140 upon which retaining nuts 142 can be threaded. The U-bolts 126 also includes opposing tabs or projections 144 that extend inward from the legs 130. The projections 144 extend toward one another and are preferably slightly offset from the U-bolt concave portion 128.

Figure 10:
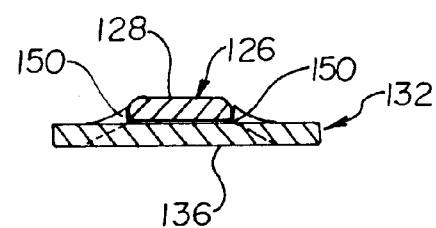
FIG. 10 is a fragmentary cross-sectional view taken along section line 10—10 of FIG. 8.

The second curved shim 132 of the clamp 120 includes a central portion 146 and two flange portions 148 that project outward from opposite ends of the central portion 146. The central portion 146 is adapted to form the concave side 136 of the second curved shim 132. Referring to FIG. 10, the second curved shim 132 also includes two spaced-apart shim projections 150 that extend outward from a mid-region of the central portion 146. The shim projections 150 are arranged and configures to straddle the concave portion 128 of the U-bolt 126 when the second curved shim 132 is mounted on the U-bolt 126. By straddling the U-bolt 126, the projections 150 inhibit axial movement between the U-bolt 126 and the second curved shim 132 to maintain alignment thereinbetween.

Each flange portion 148 of the second curved shim 132 is generally L-shaped and includes a first leg 152 that projects transversely outward from the shim central portion 146, and a second leg 154 preferably aligned transversally with respect to the first leg 152. Each first leg 152 defines a flange opening 156 arranged and configured for receiving one of the legs 138 of the U-bolt 126. Additionally, each second leg 154 defines a screw opening 158. The screw openings 158 are arranged and configured to allow a heat shield to be connected to the clamp 120 via known techniques such as a self-threading screw.

To mount the second curved shim 132 on the U-bolt 126, the legs 138 of the U-bolt 126 are inserted through the flange openings 156 defined by the curved shim 132. The second curved shim 132 is then slid along the U-bolt's legs 138 until the second shim 132 engages the inward projections 144 of the U-bolt 126. To maneuver the second curved shim 132 past the projections 144, the second curved shim 132 is flexed inward to provide sufficient clearance for the projections 144 to pass through the flange openings 156. Once the inward projections 144 of the U-bolt have been passed through the flange openings 156, the second curved shim 132 is allowed to flex back outward such that the second curved shim 132 is effectively secured on the U-bolt 126 by the inward projections 144. Specifically, the inward projections 144 engage the first legs 152 to inhibit the second curved shim 132 from sliding off of the U-bolt 126.

When the second curved shim 132 is secured to the U-bolt 126, the shim projections 150 straddle the U-bolt 126 to inhibit axial movement between the second curved shim 132 and the U-bolt 126. To remove the second curved shim 132 from the U-bolt 126, the second curved shim 132 is flexed inward to provide clearance for passing the U-bolt projections 144 through the flange openings 156. In this manner, the second curved shim 132 can be slid off the legs 138 of the U-bolt 126.

The saddle member 122 of the clamp 120 includes a pair of spaced-apart and substantially parallel saddle plates 162. The saddle plates 162 are connected by a base plate 164 that extends transversely between base ends of the saddle plates 162. The base plate 164 defines two spaced-apart base plate openings 166 arranged and configured for receiving the legs 138 of the U-bolt 126 when the U-bolt 126 is mounted on the saddle member 122. The saddle plates 162 together form two saddle legs 168 which define the concave saddle portion 124 of the saddle member 122. The saddle member 122 also includes two pairs of retaining tabs 170 that project outward from opposite sides of the saddle plates 162. The retaining tabs 170 are arranged and configured to snap fit within retaining openings 172 defined by the first curved shim 130.

The first curved shim 130 includes a central portion 174 arranged to define the concave side 134. The first curved shim 130 also includes two retaining ears 176 that project transversely outward from opposite ends of the central portion 174. Each retaining ear 176 has a generally C-shaped cross section that defines a channel 178 sized for receiving one of the saddle member legs 168. Specifically, each retaining ear 176 includes a bed wall 180 that projects transversely outward from the central portion 174, and two opposing side walls 182 that extend transversely outwardly from the bed wall 180 to define the channel 178. The bed walls 180 of the retaining ears 176 define openings 184 sized for receiving the legs 138 of the U-bolt 126. Additionally, the side walls 182 of the retaining ears 176 define the retaining openings 172 that are adapted for receiving the retaining tabs 170 of the saddle member 122.

Figure 9:
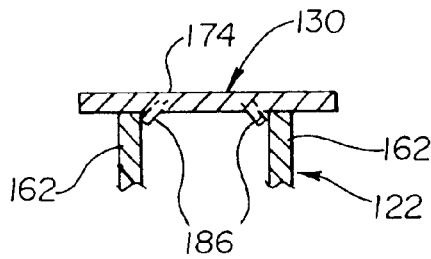
FIG. 9 is a fragmentary cross-sectional view taken along section line 9—9 of FIG. 7.

As shown in FIG. 9, the first curved shim 130 also includes a pair of shim projections 186 that extend outward from a central region of the central portion 174 of the first curved shim 130. The shim projections 186 are adapted to fit between the saddle plates 162 to limit axial sliding and maintain alignment between the first curved shim 130 and the saddle member 122 when the first curved shim 130 is mounted thereon.

To mount the first curved shim 130 on the saddle member 122, the saddle plates 162 are flexed together and the saddle legs 168 are inserted in the channels 178 defined by the retaining ears 176 of the first curved shim 130. Once the saddle legs 168 are inserted within the channels 178, the saddle plates 162 are allowed to flex outward such that the retaining tabs 170 snap within the retaining openings 172 defined by the retaining ears 176. In such a mounted configuration, the shim projections 186 of the first curved shim 132 fit between the saddle plates 162 to limit axial movement between the first curved shim 130 and the saddle member 122. To remove the first curved shim 130 from the saddle member 122, the saddle plates 162 are pressed together such that the retaining tabs 170 are displaced from the retaining openings 172 defined by the retaining ears 176 of the first curved shim 130. With the retaining tabs 170 displaced from the retaining openings 172, the first curved shim 130 can be disconnected from the saddle member 122.

In use, the second curved shim 132 is snapped on the U-bolt 126, and the first curved shim 130 is snapped on the saddle member 122. Next, a pipe or any other structure desired to be clamped, is positioned between the first and second curved shims 130 and 132, and the legs 138 of the U-bolt 126 are inserted through the openings 184 and 166 that are respectively defined by the first curved shim 130 and the saddle member 122. Once the U-bolt 126 is coupled with the saddle member 122, the nuts 142 are threaded on the threaded ends 140 of the legs 132 to tighten the clamp 120 about the pipe.

It will be appreciated that the shim projections 150 and 186, and the retaining tabs 170, can have a variety of shapes such as bumps, tabs, lips, shoulders, grooves, slots, depressions, channels or any other alternative abutting, mating, complementary or interlocking structures. Additionally, the shim projections 150 and 186, and the retaining tabs 170, can be made by a variety of techniques. A preferred technique is to punch the shim projections 150 and 186, and the retaining tabs 170, partially through their corresponding part with a punching tool.

Figure 11:
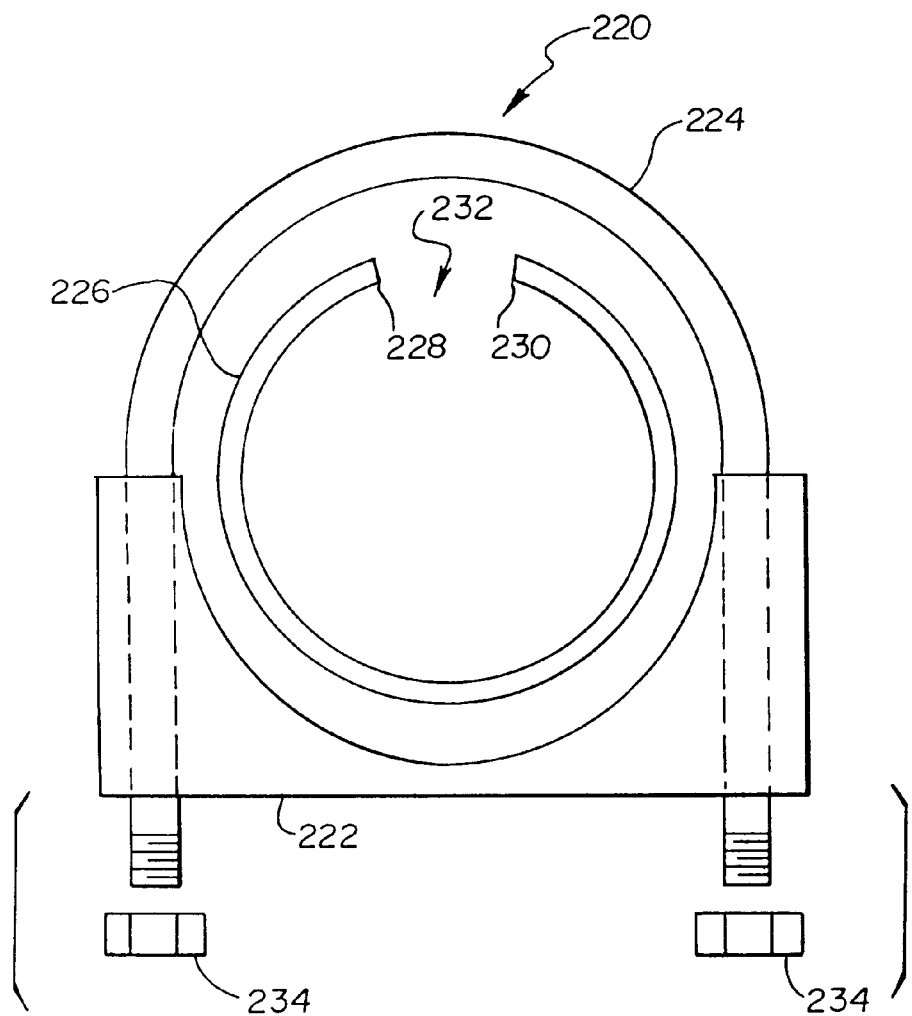
FIG. 11 is a second alternate embodiment of a clamp constructed in accordance with the principles of the present invention.
Figure 12:
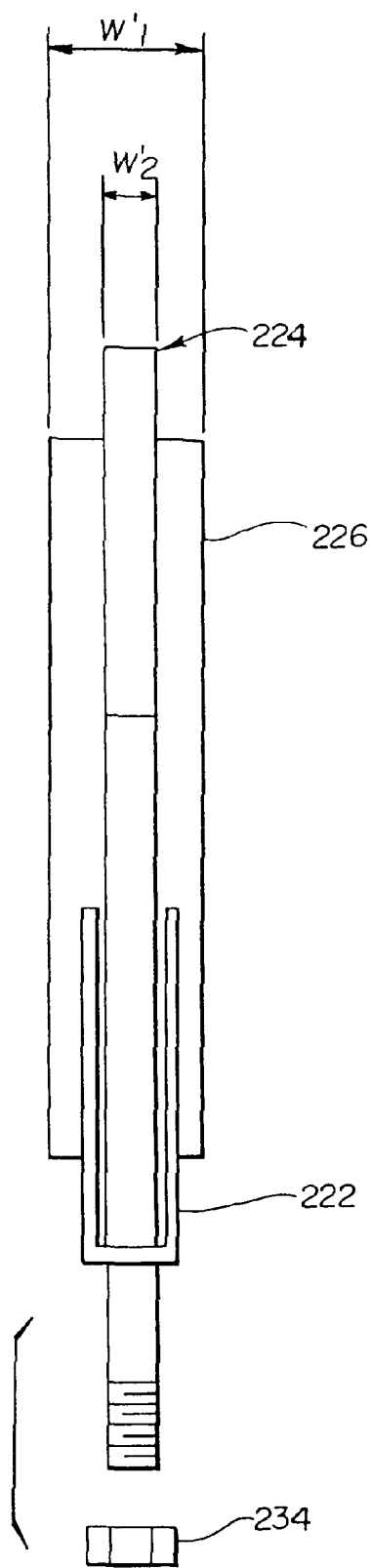
FIG. 12 is a side view of the clamp of FIG. 11.
Figure 14:
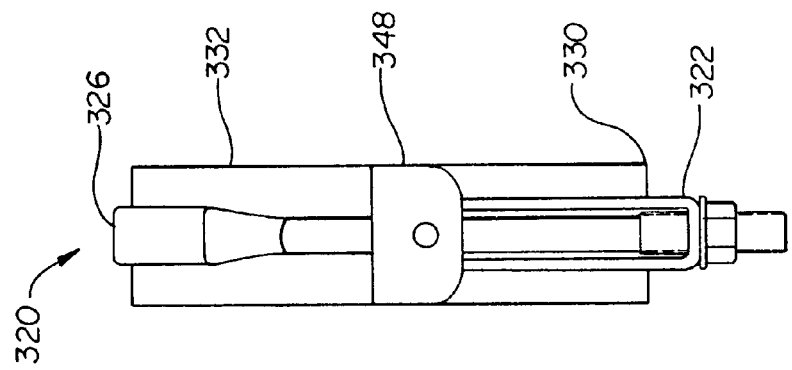
FIG. 14 is a side view of the clamp of FIG. 13.

FIGS. 11 and 12 show a second alternate guillotine-type clamp 220 constructed in accordance with the principles of the present invention. The clamp 220 includes a saddle member 222 and a U-bolt 224 mountable on the saddle member 222. The clamp 220 also includes a shim member 226 positioned (when assembled) between the U-bolt 224 and a saddle member 222. The shim 226 is generally cylindrical and includes first and second ends 228 and 230 between which a relatively small gap 232 is defined. The shim 226 preferably has width $w'_1$ that is greater than a width $w'_2$ of the U-bolt 224. Preferably, the width $w'_1$ is at least 1.5 or 2 times as great as the width $w'_2$.

In use, the shim 226 is first placed around a structure desired to be clamped, such as a pipe (not shown). Next, the shim 226 is captured between the U-bolt 224 and the saddle member 222 as the U-bolt 224 and the saddle member 222 are interconnected. Finally, the clamp 220 is tightened by threading nuts 234 on threaded ends of the legs of the U-bolt 224. As the clamp 224 is tightened, the shim 226 is compressed, causing the shim gap 232 to close. In this manner, the shim 226 is adapted for effectively sealing a lap joint. Additionally, the shim 226 effectively separates or insulates the U-bolt 224 and the saddle member 222 from the structure being clamped. In this manner, as previously described, the shim 226 assists in inhibiting premature corrosion of the structure being clamped.

FIGS. 13–16 illustrate a third alternate clamp 320 constructed in accordance with the principles of the present invention. As is apparent from FIGS. 13 and 14, the clamp 320 has a configuration similar to the clamp 120 depicted in FIGS. 7 and 8. For example, the clamp 320 includes a saddle member 322, a U-bolt 326 mountable on the saddle member 322, a first curved shim 330 secured to the saddle member 322, and a second curved shim 332 secured to the U-bolt 326. The curved shims 330 and 332 include concave inner surfaces that are adapted to oppose one another when the U-bolt 326 is mounted on the saddle member 322. The first curved shim 330 includes outwardly extending ears 376 for providing a snap-fit connection with leg portions 368 of the saddle member 322, while the second curved shim 332 includes outwardly extending flanges 348 for providing a snap-fit connection with the U-bolt 326. The first and second curved shims 330 and 332 respectively define first and second pairs of leg openings 384 and 356 that are adapted to co-axially align when the U-bolt 326 is mounted on the saddle 322. The leg openings 384 and 356 are arranged and configured to receive legs 338 of the U-bolt 326.

While clamps 120 and 320 are similar in many aspects, the clamp 320 has been modified to include different snap-fit configurations than the configurations shown and described with respect to the clamp 120. For example, as shown in FIG. 15, each ear 376 of the first curved shim 330 includes side walls 382 that define a channel 378 sized for receiving one of the leg portions 368 of the saddle member 322. The side walls 382 are bent inward so as to extend generally toward one another. In contrast, the leg portions 368 of the saddle 322 include end portions 369 that are bent outward so as to extend generally away from one another. The bent side walls 382 of the ears 376 cooperate with the end portions 369 of the saddle leg portions 368 to provide an interconnection between the first curved shim 330 and the saddle member 322. Specifically, the end portions 369 engage the side walls 382 to inhibit the first shim 330 from being removed from the saddle member 322.

The first shim 330 is secured to the saddle member 322 by compressing the end portions 369 together and inserting the end portions within the channels 378. Once the end portions 369 are within the channels 378, the end portions 369 are released from compression such that the end portions 369 expand outward into engagement with the bent side walls 382. In such an orientation, interference between the side walls 382 and the end portions 369 inhibits the first shim 330 from being removed from the saddle member 322. The first shim 330 can be removed from the saddle member 322 by flexing or compressing the end portions 369 together such that interference between the side walls 382 and the end portions 369 is eliminated, and withdrawing the end portions 369 from the channels 378.

Figure 13:
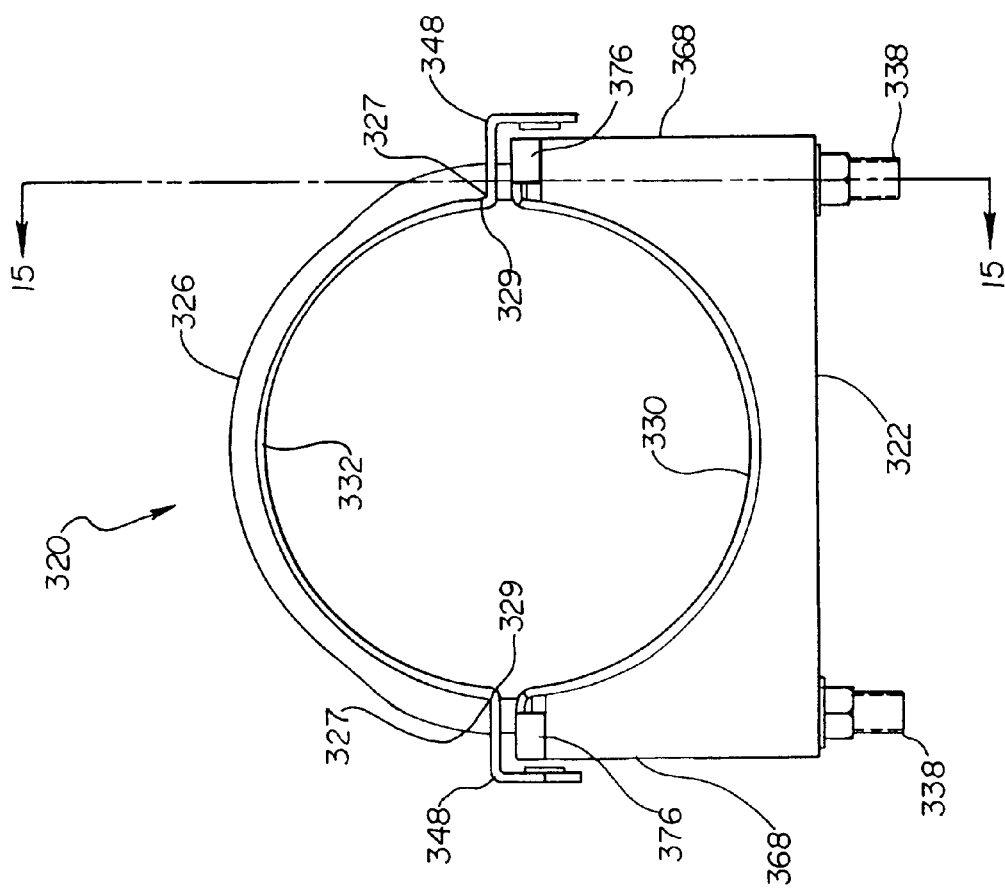
FIG. 13 is a third alternate embodiment of a clamp constructed in accordance with the principles of the present invention.

A different snap-fit configuration has also been utilized to secure the second curved shim 332 to the U-bolt 326. For example, as shown in FIGS. 13 and 16, the U-bolt 326 defines opposing, inwardly facing notches 327 located along the legs 338 of the U-bolt 326. The notches 327 receive inner portions 329 flanges 346 of the second shim 332 to retain the second shim 332 on the U-bolt 326. The inner portions 329 of the flanges 346 define inner portions of the leg openings 356. As shown in FIG. 16, alignment between the U-bolt 326 and the second shim 332 is maintained by an inwardly extending, elongated projection 333 formed on the U-bolt 326 that fits within a corresponding elongated slot or channel 335 defined by the second shim 332. The projection 333 and slot 335 are both preferably centrally located.

The second shim 332 is secured to the U-bolt 326 by inserting the legs 338 of the U-bolt 326 through the leg openings 356 until the inner portions 329 of the flanges 346 snap within the notches 327 formed in the U-bolt 326. The second shim 332 can be removed from the U-bolt 326 by flexing the second shim 332 inward until the inner portions 329 are displaced from the notches 327, and then sliding the second shim 332 off the U-bolt 326.

FIGS. 17–24 illustrate a fourth clamp 420 constructed in accordance with the principles of the present invention. The clamp 420 includes a U-bolt 426 and a curved, U-bolt shim 428 connected to the U-bolt 426. The clamp 420 also includes a saddle number 422 and a curved, saddle shim 430 connected to the saddle member 422.

Figure 17:
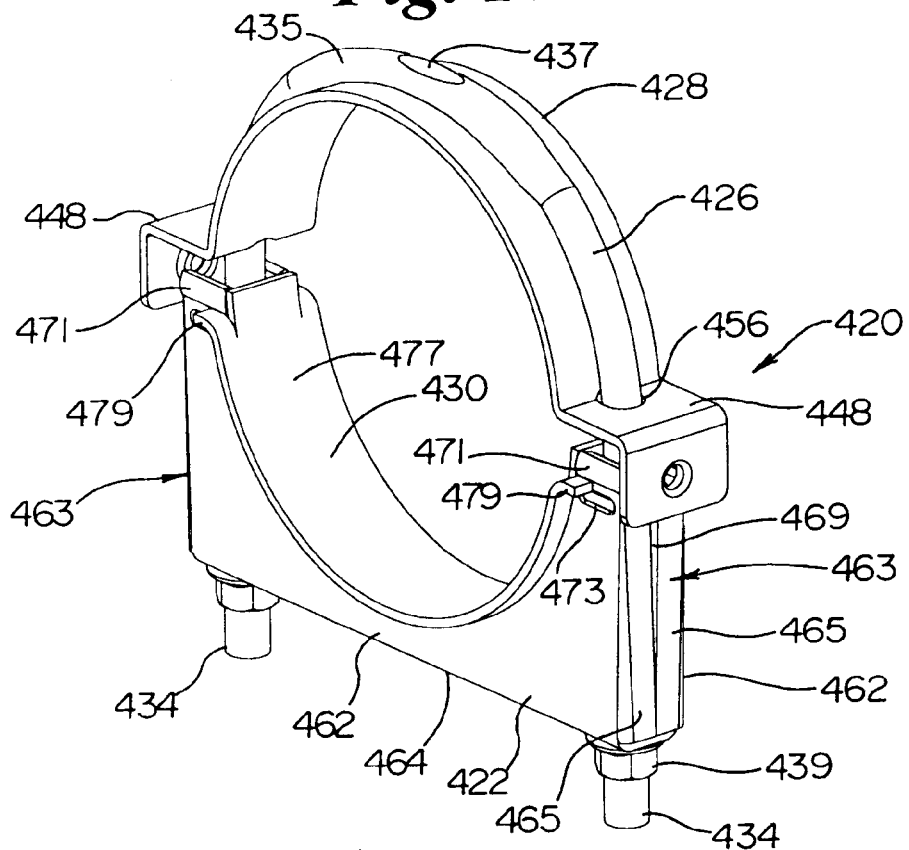
FIG. 17 is a fourth alternate embodiment of a clamp constructed in accordance with the principles of the present invention.

Referring to FIG. 17, the U-bolt 426 of the clamp 420 has substantially parallel legs 434 interconnected by a bridge portion 435. The legs 434 have generally circular cross-sections, while the bridge portion 435 has a generally oblong cross-section. A flattened portion 437 is located at the top of the bridge portion 435.

Figure 19:
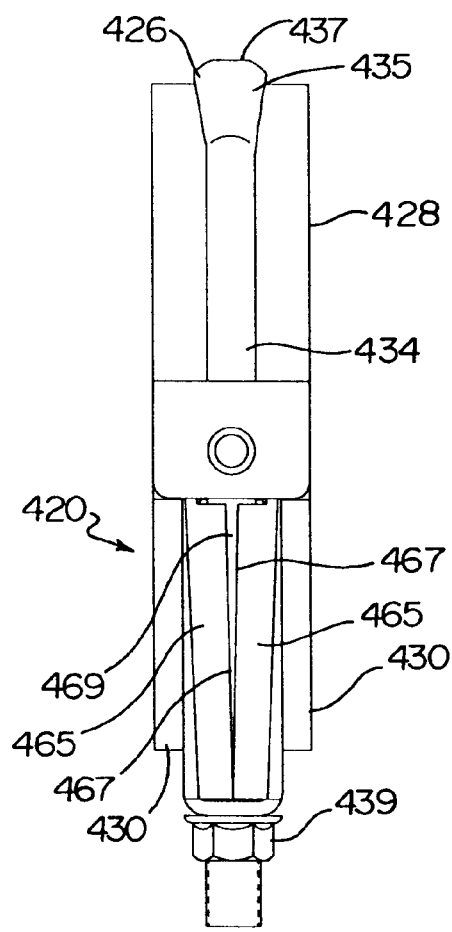
FIG. 19 is a right side view of the clamp of FIG. 18.
Figure 20:
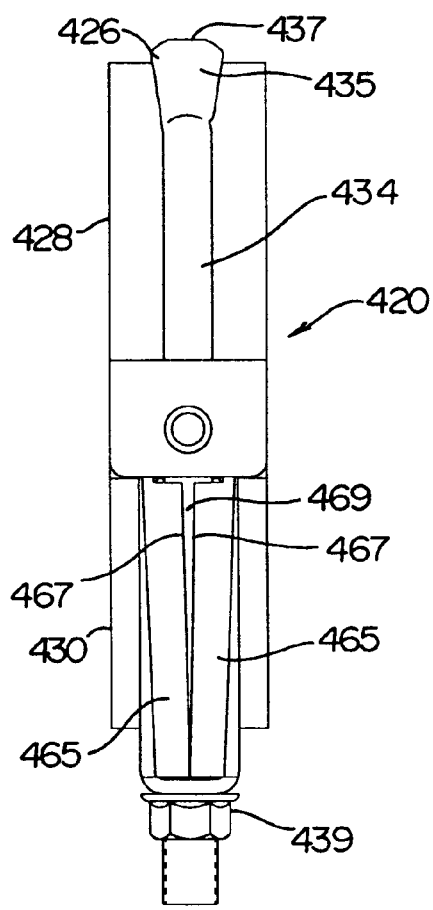
FIG. 20 is a left side view of the clamp of FIG. 18.
Figure 21:
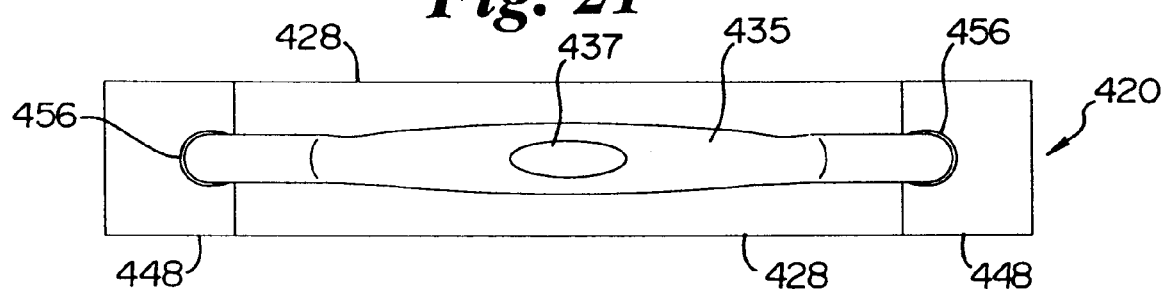
FIG. 21 is a top view of the clamp of FIG. 18.
Figure 22:
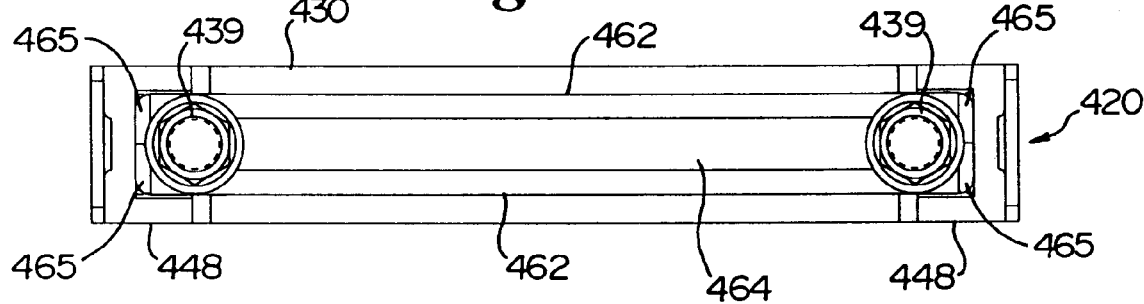
FIG. 22 is a bottom view of the clamp of FIG. 18.

The U-bolt shim 428 is mounted on the inside of the U-bolt 426. The shim 428 includes oppositely disposed flanges 448 that project radially outward from a main body of the shim 428. The flanges 448 define holes 456 (best shown in FIG. 21) sized for receiving the legs 434 of the U-bolt 426. The saddle member 422 of the clamp 420 is preferably formed from a single piece of material that is bent to a desired configuration. For example, the saddle member 422 includes front and back saddle plates 462 that are spaced apart and generally parallel with respect to one another. A base plate 464 (best shown in FIG. 22) interconnects the two saddle plates 462. The saddle plates 462 have oppositely disposed ends 463. To reinforce the saddle member 422, the ends 463 of the saddle plates 462 are bent toward one another to form reinforcing end walls 465 that are generally perpendicular with respect to the saddle plates 462 and substantially close the ends 463 of the plates 462. As best shown in FIGS. 19 and 20, the end walls 465 have opposing inner edges 467. Each set of opposing inner edges 467 defines a gap 469 that extends vertically along its corresponding end of the saddle member 422. Each gap 469 is tapered such that the width of each gap 469 is larger adjacent the top of the saddle member 422. Of course, non-tapered gap could also be used.

Figure 23:
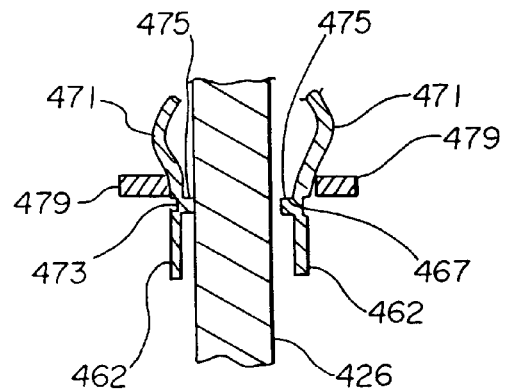
FIG. 23 is a cross-sectional view taken along section line 23—23 of FIG. 18.

As shown in FIG. 17, the saddle member 422 also includes upper tabs 471 that project outward from the front and back sides 462 of the saddle member 422. Punched recesses 473 are preferably located below the upper tabs 471. As shown in FIG. 23, the punched recesses 473 form inner projections 475. The inner projections 475 extend from the saddle plates 462 toward each other in the region located between the saddle plates 462. The legs 434 of the U-bolts 426 preferably extend between the projections 475. In this manner, the projections 475 preferably help to reduce lateral play between the U-bolt 426 and the saddle member 422 so as to improve alignment between the two shims 428 and 430. This is significant because the threaded ends of the legs 434 typically have a larger diameter than the portion of the legs 434 that is adjacent to the projections 475.

Figure 18:
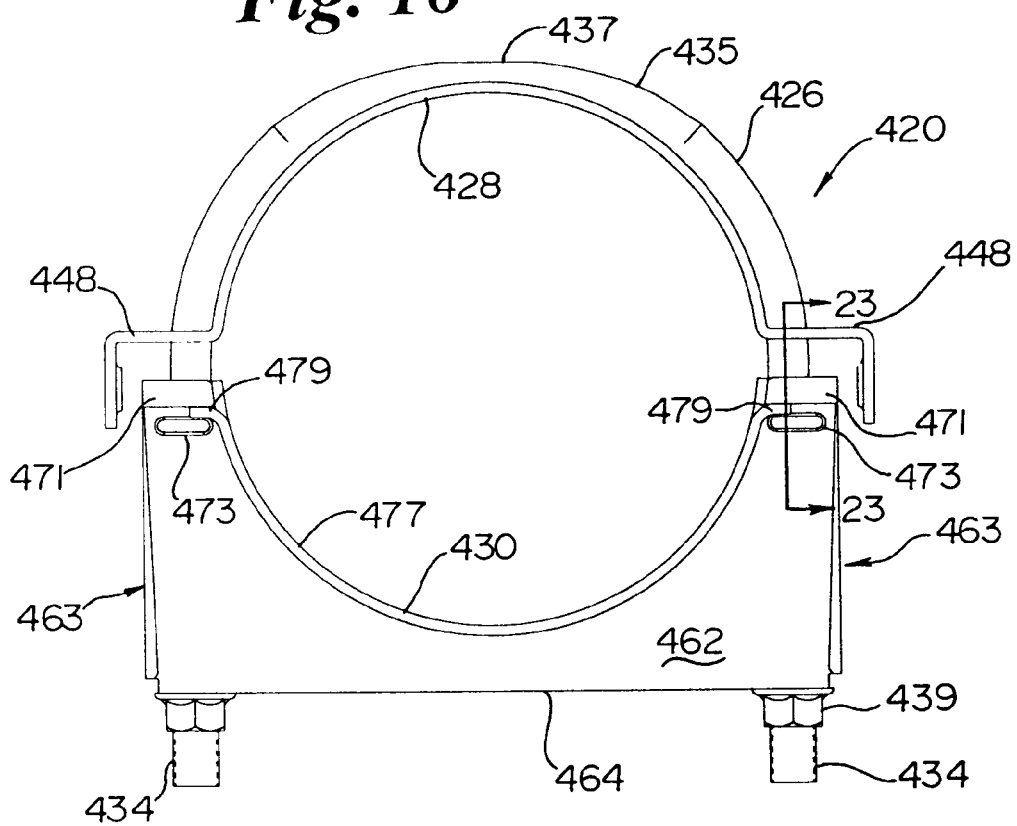
FIG. 18 is a front view of the clamp of FIG. 17.

Referring to FIGS. 17 and 18, the saddle shim 430 of the clamp 420 includes a curved main body 477. At each end of the curved main body 477, a pair of ears 479 project radially outward from the main body 477.

Figure 24:
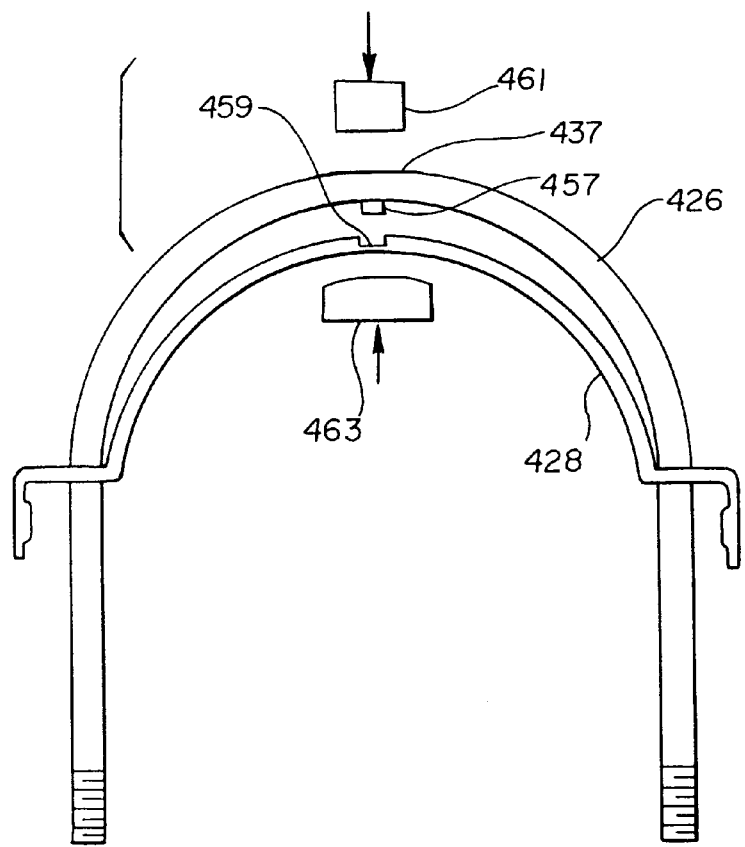
FIG. 24 is an exploded assembly view of a portion of the clamp of FIG. 18.

To connect the U-bolt shim 428 to the U-bolt 426, the legs 434 or the U-bolt 426 are preferably inserted through the holes 456 defined by the flanges 448 of the U-bolt shim 428. The U-bolt shim 428 is then preferably slid up the U-bolt 426. As shown in FIG. 24, the U-bolt 426 preferably includes a downwardly extending alignment projection 457 adapted to fit within a recess 459 defined in the top side of the U-bolt shim 428. The alignment projection 457 preferably has a length slightly longer than the depth of the recess 459, and is preferably configured to fit within the recess 459. Once the alignment projection 457 is inserted within the recess 459, the U-bolt 426 and the U-bolt shim 428 are preferably projection welded together. For example, as shown in FIG. 24, a flat upper electrode 461 is preferably placed against the flattened portion 437 of the U-bolt 426, while a cylindrical lower electrode 463 is preferably contacted against the lower surface of the U-bolt shim 428. In this manner, the electrodes 461 and 463 can be used to heat and melt the alignment projection 457 within the recess 459. Consequently, upon cooling, a projection weld is generated between the U-bolt 426 and the U-bolt shim 428.

To mount the saddle shim 430 of the clamp 420 on the saddle member 422, the front and back saddle plates 462 of the saddle member 422 are preferably squeezed together thereby closing the tapered gaps 469 formed at the ends of the saddle member 422. In such a squeezed position, the saddle shim 430 can be mounted on the top of the saddle member 422 with the ears 479 straddling the front and back saddle plates 462. After the saddle shim 430 has been mounted on the saddle member 422, the pressure applied to the saddle plates 462 can be released thereby allowing the saddle plates 462 to spring resiliently outward toward their normal position. In the normal position, the upper tabs 471 of the saddle plates 462 overlap the ears 479 of the saddle shim 430. Mechanical interference between the upper tabs 471 and the ears 479 inhibits the saddle shim 430 from being inadvertently removed from the saddle member 422.

To mount the assembled U-bolt 426 and U-bolt shim 428 on the assembled saddle member 422 and saddle shim 430, the legs 434 of the U-bolt 426 are inserted between the front and back saddle plates 462 of the saddle member 422. As inserted, the legs 434 extend along the end walls 465 formed at the ends 463 of the saddle member 422. Preferably, the threaded ends of the legs 434 extend through openings (not shown) defined through the base plate 464. Nuts 439 are preferably threaded on the threaded ends of the legs 434 to prevent the saddle member 422 from disengaging from the U-bolt 426.

Throughout the specification, it will be appreciated that the shims could also be referred to as sealing plates, sealing members and insulators. Also, the saddle portion could also be referred to as a saddle structure, a saddle configuration, a U-bolt receiving portion, a U-bolt receiving member, a U-bolt receiving plate, a U-bolt receiving bracket, and an arrangement for receiving a U-bolt. Moreover, in certain embodiments of the present invention, the U-bolt, the saddle portion and the shims could have rectangular or square configurations adapted for clamping rectangular or square conduit.

In one particular embodiment of the present invention, the distance between the centers of the U-bolt legs is about 5.6 inches, the radial thickness of the flattened portion of the U-bolt is about 0.3 inches, the axial width of the flattened portion of the U-bolt not including the curved edges is about 0.5 inches, the total width of the flattened portion of the U-bolt is about 0.56 inches, the length of the threaded portions of the U-bolt are about 1.5 inches, the radius of the concave portion of the U-bolt is about 2.6 inches, and the length of the U-bolt is about 7 inches. Also in the particular embodiment, the length of the saddle portion is about 6.6 inches, the radius of the concave saddle portion is about 2.6 inches, and the height of the saddle portion is about 3 inches. Additionally in the particular embodiment, the shims have widths of about 1.25 inches and thicknesses of about 0.10 inches. It will be appreciated that the above dimensions are strictly illustrative and are not intended to be construed as a limitation on the scope of the present invention.

With regard to the foregoing description, it is to be understood that changes may be made in detail, especially with regard to the shape, size and arrangement of the parts without departing from the scope of the present invention. It is intended that the specification and depicted aspect be considered exemplary only, with a true scope and spirit of the invention being indicated by the broad meaning of the following claims.

We claim:
1. A clamp comprising:
   a saddle member having a concave saddle portion;
   a U-bolt mounted on the saddle member, the U-bolt having a concave portion oriented opposed to the saddle member concave saddle portion; and
   at least one shim positioned between the U-bolt and the saddle member, the shim being made of metal and forming substantially a full cylinder at least when the saddle member and the U-bolt are drawn completely together.
2. The clamp of claim 1, wherein the at least one shim has a width that is greater than a width of the U-bolt.
3. The clamp of claim 2, wherein the width of the at least one shim is at least one and a half times the width of the U-bolt.
4. The clamp of claim 1, wherein the at least one shim has a generally rectangular cross-section.
5. The clamp of claim 1, wherein the at least one shim is arranged and configured to separate the U-bolt and saddle member from a structure desired to be clamped.
6. The clamp of claim 5, wherein the U-bolt and saddle member are zinc-plated, and the at least one shim is made of aluminized steel.
7. The clamp of claim 1, wherein the saddle member comprises a double saddle.
8. The clamp of claim 1, wherein the at least one shim comprises a first curved shim secured to the saddle member concave saddle portion, and the at least one shim also includes a second curved shim secured to the U-bolt concave portion, the first curved shim having a concave side opposed to a concave side of the second curved shim, and the first and second curved shims each forming substantially a half-cylinder.
9. A clamp comprising:
   a saddle member having a concave saddle portion;
   a U-bolt mounted on the saddle member, the U-bolt having a concave portion oriented opposed to the saddle member concave saddle portion;
   a first curved shim secured to the saddle member concave saddle portion, the first curved shim being made of metal;
   a second curved shim secured to the U-bolt concave portion, the second shim being made of metal, and the first curved shim having a concave side opposed to a concave side of the second curved shim; and
   wherein the first curved shim is secured to the saddle member by a snap-fit connection.

10. The clamp of claim 9, wherein the first curved shim includes a curved central portion and two retaining ears projection outward from opposite ends of the curved central portion, the retaining ears defining openings arranged and configured for receiving U-bolt legs of the U-bolt.

11. The clamp of claim 10, wherein the retaining ears define channels arranged and configured for receiving saddle legs of the saddle member, and the snap fit connection is provided between the retaining ears and the saddle legs.

12. A clamp comprising:
a saddle member having a concave saddle portion;
a U-bolt mounted on the saddle member, the U-bolt having a concave portion oriented opposed to the saddle member concave saddle portion;
a first curved shim secured to the saddle member concave saddle portion, the first curved shim being made of metal;
a second curved shim secured to the U-bolt concave portion, the second shim being made of metal, and the first curved shim having a concave side opposed to a concave side of the second curved shim; and
wherein the saddle member is formed by two opposing spaced-apart saddle plates, and the first curved shim includes at least one shim projection that extends between the saddle plates to limit movement and provide alignment between the saddle member and the first curved shim.

13. A clamp comprising:
a saddle member having a concave saddle portion;
a U-bolt mounted on the saddle member, the U-bolt having a concave portion oriented opposed to the saddle member concave saddle portion;
a first curved shim secured to the saddle member concave saddle portion, the first curved shim being made of metal;
a second curved shim secured to the U-bolt concave portion, the second shim being made of metal, and the first curved shim having a concave side opposed to a concave side of the second curved shim; and
wherein the second curved shim is secured to the U-bolt by a snap-fit connection.

14. The clamp of claim 13, wherein the U-bolt includes two opposing projections that extend inward from legs of the U-bolt, the projections being arranged and configured to provide the snap-fit connection with the second curved shim.

15. The clamp of claim 13, wherein the U-bolt includes two opposing notches defined by spaced-apart legs of the U-bolt, the notches being arranged and configured to provide the snap-fit connection with the second curved shim.

16. The clamp of claim 8, wherein the second curved shim includes a curved central portion and two flanges projecting transversely outward from the central portion, the flanges each being generally L-shaped and each having an opening arranged and configured for receiving a leg of the U-bolt.

17. The clamp of claim 8, wherein the U-bolt includes an alignment projection that fits within a recess defined by the second curved shim.

18. The clamp of claim 17, wherein the U-bolt includes a flattened region positioned opposite from the alignment projection.

19. The clamp of claim 18, wherein the U-bolt and the second curved shim are projection-welded together.

20. The clamp of claim 8, wherein the first curved shim includes radial ears that straddle the saddle member.

21. The clamp of claim 20, wherein the saddle member includes tabs that mechanically interfere with the radial ears to retain the first curved shim on the saddle member.

22. The clamp of claim 8, wherein the saddle member includes opposing front and back walls, and reinforcing end walls aligned at right angles with respect to the front and back walls.

23. The clamp of claim 22, wherein the front and back walls have oppositely disposed ends, and each end is substantially closed by a pair of the reinforcing end walls.

24. The clamp of claim 23, wherein each pair of end walls defines a tapered gap thereinbetween.

25. The clamp of claim 1, wherein the saddle member includes opposing, spaced-apart front and back walls, between which legs of the U-bolt are inserted.

26. The clamp of claim 25, further including opposing projections that project inward from the front and back walls for reducing play between the saddle member and the U-bolt.

27. A clamp comprising:
a saddle member having a concave saddle portion;
a U-bolt mounted on the saddle member, the U-bolt having a concave portion oriented opposed to the saddle member concave saddle portion;
a first curved shim secured to the saddle member concave saddle portion, the first curved shim being made of metal;
a second curved shim secured to the U-bolt concave portion, the second shim being made of metal, and the first curved shim having a concave side opposed to a concave side of the second curved shim; and
the first curved shim covering at least a central, mid-region of the concave saddle portion.

28. The clamp of claim 27, wherein the first curved shim covers the entire concave saddle portion.

29. The clamp of claim 27, wherein the first curved shim forms a half-cylinder.

30. The clamp of claim 27, wherein the U-bolt includes legs, and the second curved shim includes outwardly projecting ears defining openings for receiving the legs of the U-bolt.

31. The clamp of claim 27, wherein the clamp includes only two shims.

* * * * *